Sept. 20, 1960  G. M. BOUTON ET AL  2,953,673
METHOD OF JOINING WIRES
Filed April 18, 1958  2 Sheets-Sheet 1
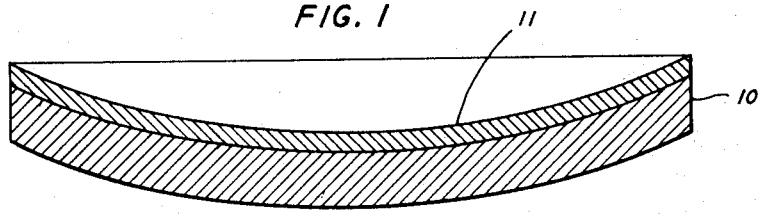
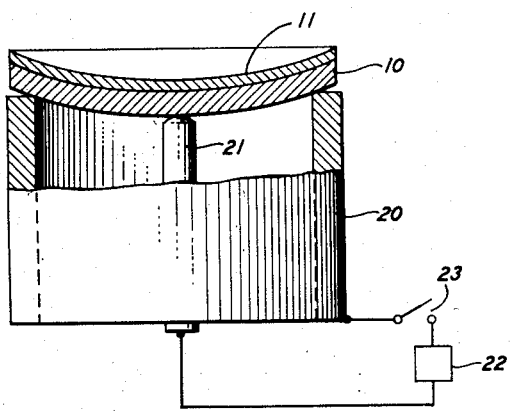
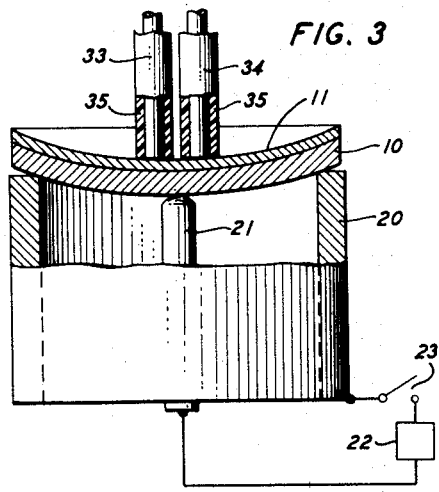
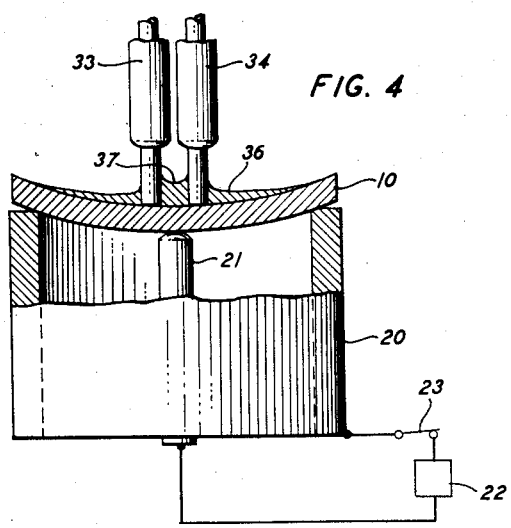
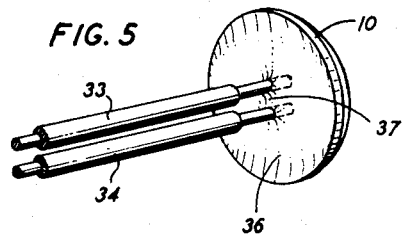
INVENTORS  G. M. BOUTON
E. L. FISHER
P. R. WHITE
BY
ATTORNEY Sept. 20, 1960  G. M. BOUTON ET AL  2,953,673
METHOD OF JOINING WIRES
Filed April 18, 1958  2 Sheets-Sheet 2
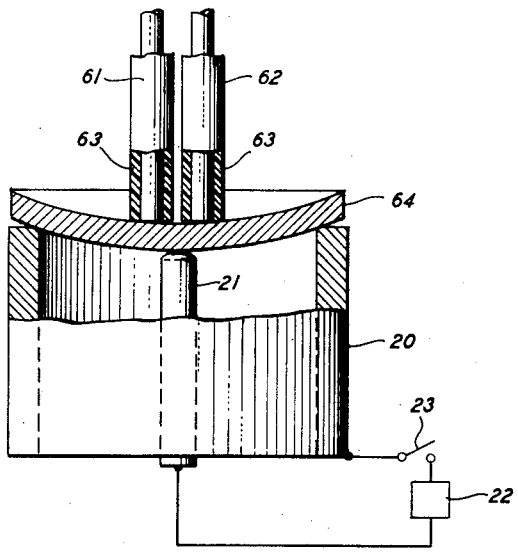
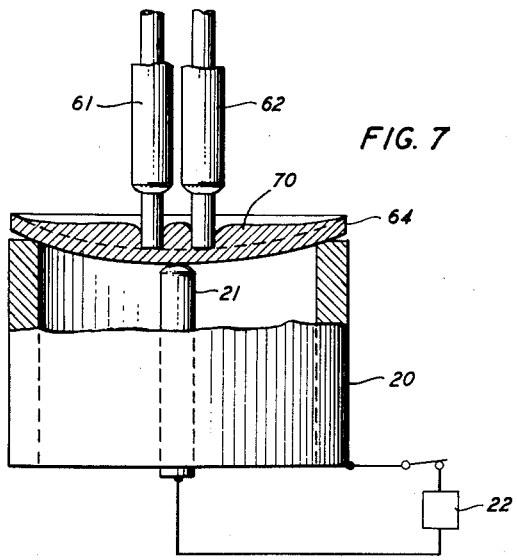
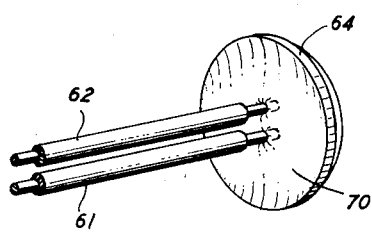
INVENTORS  G. M. BOUTON
E. L. FISHER
P. R. WHITE
BY
ATTORNEY 2,953,673
Patented Sept. 20, 1960

2,953,673
METHOD OF JOINING WIRES

George M. Bouton, Madison, Earl L. Fisher, Morristown, and Philip R. White, Murray Hill, N.J., assignors to Bell Telephone Laboratories, Incorporated, New York, N.Y., a corporation of New York Filed Apr. 18, 1958, Ser. No. 729,436

7 Claims. (Cl. 219—85)

This invention relates to a method of joining two or more wires to effect an electrically conductive connection therebetween. The present method does not require prestripping and is, therefore, particularly advantageous in the joining of insulated wires. A further advantage resides in the fact that wires differing considerably in cross-sectional area are conveniently joined.

Joining wires to form an electrically conductive connection is an operation which generally requires several steps. Heretofore, it was usually required that insulated wires, notably those coated with plastics, resins, or lacquers, had to be prestripped prior to joining. After prestripping the wires were tinned and then soldered or brazed together. The prestripping step is time consuming and consequently represents a significant portion of the cost of many electrical installations, such as are found in telegraphy and telephony. To reduce the time required by this stripping step and thus effect an overall reduction in cost, special stripping tools have been developed and are in current use. Therefore, the use of the present invention which obviates prestripping is economically advantageous over methods heretofore used.

Recently, use is being made of new materials other than copper in the manufacture of wires and cables, aluminum being one of the more prominent of these new materials. However, an obstacle in the path of increased use of aluminum wires is the difficulty encountered in joining aluminum to itself or to other metals, particularly copper. The present invention provides a simple convenient method for joining aluminum to itself or to any other metal which is capable of being soldered or alloyed in any manner known in the art.

In accordance with the present invention one end of each wire to be joined is contacted to a restricted area of a metal surface composed of or coated with an alloying agent, the metal surface is heated to form a puddle of molten metal surrounding and wetting the ends of the wires, and the assembly is cooled. Upon solidification of the molten puddle, the wires are bonded to the metal surface and are in good electrical contact with each other. The composition of the metal surface, as described in detail below, is chosen to facilitate the joining of the wires and, in some instances, to eliminate the need for a separate flux.

In an illustrative embodiment of the invention, one end of each of two polyethylene-insulated copper wires is contacted to the concave face of a steel disk which is coated with a low-melting solder containing phosphorus. The disk is then heated by passing an electric current therethrough, thus melting the solder. The temperature of the wires increases by reason of heat conduction from the disk, and the polyethylene insulation melts away and exposes bare wire. As the temperature of the disk rises above 700° F. the phosphorus actively reacts with any copper oxide which may be present on the surface of the wires, thus exposing the clean surfaces necessary for joining and permitting wetting by the molten solder. The assembly is then cooled. In addition to wetting the clean, unoxidized surface of the wires and thus forming the basis of the electrical connection, the molten puddle serves the further purpose of protecting the unoxidized surfaces from contact with the atmosphere. This protection from reoxidation is essential to the success of the process.

The formation of an electrically conductive connection between two or more aluminum wires is conveniently accomplished in accordance with the present invention. In an illustrative embodiment described in detail below, the wires to be joined are contacted to a steel disk coated with zinc. As the disk is heated a puddle of zinc-aluminum alloy is formed, and as the temperature of the disk increases the aluminum wires continue to dissolve into the molten puddle. By reason of the melting of the aluminum wires, clean, unoxidized surface is exposed to and wet by the molten puddle of metal. When the assembly is cooled, an electrically conductive connection is found to have been formed. The molten puddle serves the same purpose in this embodiment as that described above, namely that of protecting the unoxidized surface from being reoxidized. A third illustrative embodiment involves the formation of an electrically conductive connection between aluminum wires and copper wires.

The invention will be more fully understood from the following detailed description taken in conjunction with the accompanying drawings in which:

Fig. 1 is a cross-sectional view of a disk suitable for use in one embodiment of this invention;

Fig. 2 is a combined schematic and diagrammatic view, partly in section, of an apparatus used to heat the disk in Fig. 1 in accordance with this invention;

Fig. 3 is a combined schematic and diagrammatic view, partly in section of the apparatus of Fig. 2 including wires to be joined in accordance with the present invention;

Fig. 4 is a combined schematic and diagrammatic view, partly in section, of the apparatus of Fig. 2 including two wires which have been joined in accordance with this invention;

Fig. 5 is a perspective view of the two wires and disk shown in Fig. 4;

Fig. 6 is a combined schematic and diagrammatic view, partly in section, of an apparatus used to form a joint in accordance with a second embodiment of this invention;

Fig. 7 is a combined schematic and diagrammatic view, partly in section, of wires which have been joined in accordance with this invention; and Fig. 8 is a perspective view of the wires and disk shown in Fig. 7.

With reference now more particularly to the illustrative embodiment depicted in Figs. 1 through 5, Fig. 1 depicts a disk 10 with coating 11 on the concave side thereof. This type of coated disk is used in the practice of one embodiment of the present invention. The coating 11 is a low-melting metal alloy or solder, and the disk 10 is a high-melting metal or alloy which remains intact during the joining process and forms the base of the joint. The low-melting alloy coating 11 serves to lower the temperature to which the disk and wires must be heated in order to form a good electrical connection, and also as the vehicle for the alloying materials essential to the formation of the joint.

As in all soldering procedures, it is essential in the practice of this process that the wires to be joined have clean unoxidized surface areas exposed to the molten puddle of metal which forms upon heating. This may be accomplished, for instance, in the joining of copper to copper wires, by the inclusion of phosphorus in coating 11. Phosphorus reacts with copper oxides at temperatures above 700° F. and, therefore, when the molten puddle of metal surrounding the copper wires reaches this temperature the phosphorus reacts with the copper oxide on the surface of the wires thereby exposing a clean, unoxidized surface.

The disk 10 depicted in Fig. 1 is concave to facilitate the formation of a puddle of molten metal and to prevent the molten metal from spilling off the disk. It is possible to use a flat disk for the practice of this invention, the forces of surface tension and the phenomenon of capillarity aiding in the making of a good electrical connection. Advantage is taken of capillarity by maintaining the wires in close proximity to each other thereby causing the molten metal to be drawn up into the spaces between the wires. However, when a flat disk is used, it is convenient to use a retaining wall, such as a hollow cylinder surrounding the wires to be joined and in contact with the disk, to confine the molten metal to a restricted area. In this connection, a practical expedient is the use of a ribbon of metal instead of a disk, and a hollow punch as the retaining wall. After the joint is completed the punch is driven through the ribbon, punching out a disk to which the wires are already attached.

Fig. 2 depicts one method of heating disk 10 to an elevated temperature in accordance with the present invention. The method depicted in Fig. 2 takes advantage of the fact that Joule heat is generated by the passage of an electrical current through a body. The disk 10 is placed upon cylinder 20 so that the top of the cylinder contacts the periphery of the disk 10. Electrode 21 contacts the underside of disk 10 at its center. Current source 22 and switch 23 complete the electrical circuit which enables current to flow from that portion of the disk contacted by electrode 21 radially to the periphery of the disk 10 contacted by the top of cylinder 20.

Fig. 3 illustrates the position of wires 33 and 34 to be joined in the apparatus of Fig. 2. The wires 33 and 34, which are covered with insulation 35, are desirably placed close together with the ends to be joined contacting the center of the disk. It has been found convenient to twist the wires together to form a bundle, prior to joining. Preferably, the wires 33 and 34 are maintained against coating 11 under a slight pressure by means not shown to insure that they will be surrounded and partially covered by the puddle of molten metal which forms upon heating of the disk.

Fig. 4 illustrates the apparatus of Figs. 2 and 3, including the disk 10 and wires 33 and 34, after switch 23 has been closed. Current flows through disk 10 in the described manner, thereby heating it and melting coating 11 to form molten puddle 36.

In the embodiment under discussion, the insulation 35 is a thermoplastic material, such as polyethylene, polypropylene, or polyvinyl chloride, which melts away from those portions of wires 33 and 34 adjacent the disk during heating thereby exposing bare wire. The molten metal surrounds and wets wires 33 and 34, and is drawn up to partially fill the space 37 between the wires by capillary action. After the necessary heating period of, for example, a few seconds, switch 23 is opened and the joint is allowed to cool. For convenience a stream of coolant gas or liquid may be directed at the joint to accelerate the cooling step.

Fig. 5 depicts the electrically connected wires 33 and 34 joined in accordance with Figs. 2 through 4.

Figs. 6 through 8 are illustrative of a second embodiment of the present invention. This embodiment is distinguished from the one depicted in Figs. 1 through 5 in that a homogeneous disk is used rather than a coated disk. This embodiment is here exemplified by the joining of aluminum to aluminum wires. The joining of aluminum wires in accordance with this invention requires that the disk must be composed of a metal or alloy which in combination with aluminum forms an alloy of melting point lower than that of the disk itself. This requirement is met by metals such as silver, gold, germanium, zinc, silicon, and magnesium, and by alloys of these metals with each other or by certain alloys of these metals with other metals such as coin-silver or other alloys formed predominantly of silver or of gold. The other requirement of this embodiment, that a molten puddle be formed which protects the clean, unoxidized portions of the wires to be joined, is met by use of any such metals or alloys.

In Fig. 6, wires 61 and 62 are composed of aluminum, and disk 64 is composed of coin-silver, an alloy of 90 percent silver and 10 percent copper. Wires 61 and 62 are covered with a thermoplastic insulating material 63 such as polyethylene, polypropylene, or polyvinyl chloride. As in the embodiment previously described, wires 61 and 62 are preferably maintained against disk 64 under slight pressure by means not shown. The apparatus shown in Fig. 6 is the same as that shown in Fig. 2.

Fig. 7 illustrates the heating step which is initiated by the closing of switch 23. As the current flows through disk 64, its temperature increases and the aluminum wires become heated by conduction causing insulation 63 to melt away thereby exposing bare wire. Next, the aluminum of the wires and the metals in the surface of the disk 64 combine to form a molten alloy. As the temperature of the disk increases further, the disk 64 and wires 61 and 62 continue to melt thereby producing molten puddle 70. After passing current through the disk for a few seconds during which time the wires 61 and 62 are wet by puddle 70, the assembly is cooled to solidify molten puddle 70.

Fig. 8 illustrates the finished joint between wires 61 and 62, formed in accordance with the present invention.

Aluminum to aluminum connections may also be made in accordance with this invention using a coated disk of the type described in the first embodiment. For example, a disk coated with a metal or an alloy which alloys with aluminum is suitable. Also suitable is a disk coated with aluminum.

The present invention may be used for the preparation of copper to aluminum joints. The essential requirement for making such joints is the presence of materials essential to wet the two metals, which may be made available either in the form of a coating or as constituents of the material of which the disk itself is composed. For example, a nickel-silver disk coated with a low-melting solder containing phosphorus has been successfully used.

The method of heating described in the above embodiments is especially suitable in the practice of this invention. The current density is the highest at the center of the disk, and therefore, the temperature at that location is the highest. Thus, the necessary heat for the process is liberated in the area where it is most needed, in the area of contact of the wires and disk. Either alternating or direct current is suitable for this method of heating.

Other methods of heating which are suitable include placing the disk on a heater strip, or directing a flame against the underside of the disk.

The minimum temperature which must be attained in order to form a successful joint by the present process depends upon the particular system involved. The basic requirement of the process is that the wires must be wet by the molten puddle. In the illustration described above of joining copper to copper wires in which phosphorus is the fluxing agent, the minimum temperature is approximately 700° F., since phosphorus does not effectively attack the copper oxide coating on the wires at temperatures much below this minimum. Therefore, the molten metal does not wet the copper wires at temperatures substantially below the minimum temperature of 700° F. The low melting solder used as a vehicle for the phosphorus melts at temperatures below 700° F., so the requirement of having a molten puddle is met at temperatures of 700° F. and above.

In the instance of joining aluminum to aluminum, the minimum temperature is determined by the eutectic point of aluminum and the metals contained in the surface of the disk. This minimum temperature must be attained since obviously the wires cannot be wet until a molten puddle of metal is formed. It is preferred, however, to slightly exceed this minimum so that a molten puddle of sufficient size to wet and protect the wires may be formed within a relatively short time. However there is no advantage gained in using a temperature substantially higher than the minimum temperature.

The maximum temperature in any embodiment of this invention is the melting point of the material of which the body of the disk is composed. From this follows the requirement that the melting point of the body of the disk must be greater than the minimum temperature required to cause wetting of the wires to be joined. Where a homogeneous disk is used, as shown in Figs. 6 through 8, this requirement is met by choosing a disk material which forms an alloy with the wires to be joined, such alloy having a melting point lower than that of the disk material itself. In those instances where a coated disk is employed, this requirement may be easily met by choosing a coating whose melting point is lower than that of the body of the disk.

The present invention is not limited to joining only two wires, but any number of wires may be successfully connected merely by using a disk of appropriate size. Furthermore, unlike most joining methods, wires of dissimilar gages may conveniently be joined.

Although the illustrative embodiments set forth above describe the joining of wires insulated with a thermoplastic material which melts upon application of heat, the present invention is not limited to wires with insulation which melt away. Wires insulated with any materials may be joined by the present process to form an electrically conductive connection. For example, wires insulated with paper and wires insulated with an enamel such as polyvinyl formal, both of which form a charred residue upon heating, have been successfully joined. The mechanical strength of joints made between wires insulated with thermoplastic materials is good since there is a large area which was exposed to and wet by the molten puddle. If a mechanically strong joint is required between wires insulated with materials which are not removable by application of heat, other means such as twisting the wires together prior to joining, must be employed.

The two embodiments described above illustrate the joining of wires by processes in accordance with the present invention, neither of which requires the application of separate fluxing material. In the instance of joining copper to copper, phosphorus is used to remove the oxide film. In the example set forth describing the joining of aluminum to aluminum, unoxidized surface was produced by melting the aluminum and thus exposing new surface. However, any known soldering or alloying methods of joining metals are adaptable for use in the present invention, whether application of separate flux is required or not. The manipulative steps of contacting the wires to be joined to a disk containing or coated with the materials required to cause wetting of the wires, heating the disk to form a molten puddle which wets the wires, and cooling, are applicable to any metals or alloys which may be joined by soldering or alloying.

Although the embodiments of the invention have been described in terms of a metal disk, it is obvious that shapes such as squares, rectangles, hexagons or others are equally suitable for this use. Additionally, the term alloying as used herein is meant to cover the instance of joining aluminum to aluminum, as, by joining aluminum wires using an aluminum-coated steel disk.

Examples of the application of the present invention to specific systems are set forth below. These are intended to be illustrative only, and it is considered that the present method is not limited to the systems described.

In each of the following examples the same procedural steps were used in conjunction with an apparatus similar to that shown in Fig. 3. For convenience and brevity these procedural steps which are keyed to the numbering of the apparatus employed in Fig. 3, are set forth in the following paragraph omitting all reference to specific parameters and materials used, such information being included in the description of the particular examples.

PROCEDURE

A variable alternating-current voltage source in conjunction with a step-down transformer was used as current source 22. The disk to be used for making the connection in accordance with this invention, was placed upon cylinder 20 in contact with electrode 21. The wires to be connected were twisted together to form a bundle and were then contacted to the top of the disk under slight pressure. Switch 23 was then closed for a prescribed number of seconds during which time a molten puddle of metal formed within the disk and wet the wires to be joined. After opening switch 23, a stream of coolant was directed at the junction of the wires and the disk, such means not being shown in the figures. Although nitrogen gas was used as the coolant in all of the following examples, air or any other innocuous gas can be used, the nitrogen having been chosen merely for convenience and not for any specific property it possesses.

*Example 1*

Two 22 gage copper wires insulated with polyethylene were connected in accordance with the procedure set forth above. The disk used was concave in shape, 0.16 inch in diameter, and consisted of a 20 mils thick coating of 60–40 tin-lead solder containing 0.3 percent phosphorus upon a steel base 7 mils thick. Approximately 55 amperes of current were passed through the disk for 3 seconds, generating a Joule heat in the disk of approximately 55 watts, which heated the disk to approximately 800° F. A stream of nitrogen was directed at the junction for 3 seconds. The connection between the two wires was tested and was found to have a resistance less than 0.01 ohm.

*Example 2*

A 24 gage copper wire insulated with polyethylene was connected to a 19 gage copper wire insulated with polyethylene in accordance with the procedure set forth above. The disk used was concave in shape, 0.16 inch in diameter, and consisted of a 20 mils thick coating of 60–40 tin-lead solder containing 0.3 percent phosphorus upon a steel base 7 mils thick. Approximately 75 amperes of current were passed through the disk for 3 seconds, generating a Joule heat in the disk of approximately 75 watts, which heated the disk to approximately 850° F. A stream of nitrogen was directed at the junction for 3 seconds. The connection between the two wires was found to have a resistance of less than 0.01 ohm.

*Example 3*

Two 22 gage copper wires insulated with paper were connected in accordance with the procedure set forth above. The disk used was concave in shape, 0.16 inch in diameter, and consisted of a 20 mils thick coating of 60–40 tin-lead solder containing 0.3 percent phosphorus upon a steel base 7 mils thick. Approximately 55 amperes of current were passed through the disk for 3 seconds, generating a Joule heat in the disk of approximately 55 watts, which heated the disk to approximately 800° F. A stream of nitrogen was directed at the junction for 3 seconds. The connection between the two wires was found to have a resistance of less than 0.01 ohm.

*Example 4*

Two 22 gage copper wires insulated with polyvinyl formal were connected in accordance with the procedure set forth above. The disk used was concave in shape, 0.16 inch in diameter, and consisted of a 20 mils thick coating of 60–40 tin-lead solder containing 0.3 percent phosphorus upon a steel base 7 mils thick. Approximately 55 amperes of current were passed through the disk for 3 seconds, generating a Joule heat in the disk of approximately 55 watts, which heated the disk to approximately 800° F. A stream of nitrogen was directed at the junction for 3 seconds. The connection between the two wires was found to have a resistance of less than 0.01 ohm.

*Example 5*

Two 22 gage copper wires insulated with polypropylene were connected in accordance with the procedure set forth above. The disk used was concave in shape, 0.16 inch in diameter, and consisted of a 20 mils thick coating of 60–40 tin-lead solder containing 0.3 percent phosphorus upon a steel base 7 mils thick. Approximately 55 amperes of current were passed through the disk for 3 seconds, generating a Joule heat in the disk of approximately 55 watts, which heated the disk to approximately 800° F. A stream of nitrogen was directed at the junction for 3 seconds. The connection between the two wires was found to have a resistance of less than 0.01 ohm.

*Example 6*

Two 20 gage copper wires insulated with polyvinyl chloride were connected in accordance with the procedure set forth above. The disk used was concave in shape, 0.16 inch in diameter, and consisted of a 20 mils thick coating of 60–40 tin-lead solder containing 0.3 percent phosphorus upon a steel base 7 mils thick. Approximately 60 amperes of current were passed through the disk for 3 seconds, generating a Joule heat in the disk of approximately 60 watts, which heated the disk to approximately 850° F. A stream of nitrogen was directed at the junction for 3 seconds. The connection between the two wires was found to have a resistance of less than 0.01 ohm.

*Example 7*

Two 22 gage aluminum wires insulated with polyethylene were connected in accordance with the procedure set forth above. The disk used was concave in shape, 0.16 inch in diameter, and consisted of fine silver. Approximately 85 amperes of current were passed through the disk for 3 seconds, generating a Joule heat in the disk of approximately 85 watts, which heated the disk to approximately 1270° F. A stream of nitrogen was directed at the junction for 3 seconds. The connection between the two wires was found to have a resistance of less than 0.01 ohm.

*Example 8*

Two 22 gage aluminum wires insulated with polyethylene were connected in accordance with the procedure set forth above. The disk used was concave in shape, 0.16 inch in diameter, and consisted of an alloy of 90 percent silver, 10 percent copper. Approximately 85 amperes of current were passed through the disk for 3 seconds, generating a Joule heat in the disk of approximately 85 watts, which heated the disk to approximately 1270° F. A stream of nitrogen was directed at the junction for 3 seconds. The connection between the two wires was found to have a resistance of less than 0.01 ohm.

*Example 9*

Two 22 gage aluminum wires insulated with polyethylene were connected in accordance with the procedure set forth above. The disk used was concave in shape, 0.16 inch in diameter, and consisted of a coating of zinc 10 mils thick upon a steel base 7 mils thick. Approximately 75 amperes of current were passed through the disk for 3 seconds, generating a Joule heat in the disk of approximately 75 watts, which heated the disk to approximately 1270° F. A stream of nitrogen was directed at the junction for 3 seconds. The connection between the two wires was found to have a resistance of less than 0.01 ohm.

*Example 10*

A 22 gage aluminum wire insulated with polyethylene was connected to a 20 gage copper wire insulated with polyethylene in accordance with the procedure set forth above. The disk used was concave in shape 0.16 inch in diameter, and consisted of a 20 mils thick coating of 60–40 tin-lead solder including 0.3 percent phosphorus upon a base of nickel silver 8 mils thick. Approximately 80 amperes of current were passed through the disk for 3 seconds, generating a Joule heat in the disk of approximately 80 watts, which heated the disk to approximately 1270° F. A stream of nitrogen was directed at the junction for 3 seconds. The connection between the two wires was found to have a resistance of less than 0.01 ohm.

*Example 11*

Three polyethylene insulated copper wires of 20 gage were connected together in accordance with the procedure set forth above. The disk used was concave in shape, 0.16 inch in diameter, and consisted of a 20 mils thick coating of 60–40 tin-lead solder containing 0.3 percent phosphorus upon a steel base 7 mils thick. Approximately 75 amperes of current were passed through the disk for 3 seconds, generating a Joule heat in the disk of approximately 75 watts, which heated the disk to approximately 1270° F. A stream of nitrogen was directed at the junction for 3 seconds. The connection between the three wires was found to have a resistance of less than 0.01 ohm.

What is claimed is:

1. The method of producing an electrically conductive connection between two copper wires insulated with polyethylene which comprises the steps of contacting one end of each of said wires to the concave face of a steel disk which is coated with an alloy consisting essentially of an alloy of 40 percent lead and 60 percent tin containing .3 percent phosphorus by weight, heating said disk to a temperature of approximately 850° F. by passing an electric current therethrough thereby producing a puddle of molten metal on said disk which wets said wires, and cooling the assembly.

2. The method of producing an electrically conductive connection between two aluminum wires insulated with polyethylene which comprises the steps of contacting one end of each of said wires to the concave face of a disk formed predominantly of silver, heating said disk to a temperature of approximately 1270° F. by passing an electric current therethrough thereby producing a puddle of molten metal on said disk which wets said wires, and cooling the assembly.

3. The method of producing an electrically conductive connection between a polyethylene insulated aluminum wire and a polyethylene insulated copper wire which comprises the steps of contacting one end of each of the said wires to the concave face of a coated disk, said coated disk consisting of a metal alloy disk consisting essentially of 12 percent nickel, 29 percent zinc, and 59 percent copper which is coated with a layer of solder which consists essentially of an alloy of 40 percent lead and 60 percent tin containing 0.3 percent phosphorus by weight, heating said coated disk to a temperature of approximately 1270° F. thereby producing a puddle of molten metal on said disk which wets said wires, and cooling the assembly.

4. The method of producing an electrically conductive connection between at least two wires each of which is insulated with a thermoplastic material which comprises the steps of contacting one end of each of the said wires to the concave face of a metal disk having a metallic surface of such composition that heating the said surface in contact with the said wires results in a melt which wets the said wires, heating the said disk to a temperature sufficient to produce such a melt by passing an electric current therethrough, thereby producing a puddle of molten metal on said disk which wets the said wires, and cooling the assembly, and in which the composition of the said disk is such that its melting point is greater than the temperature necessary to produce the said melt.

5. The method of claim 4 in which the said surface consists essentially of a solder composition which wets the said wires when in the molten state.

6. The method of claim 4 in which the said metallic surface is of such composition that it forms an alloy with the said wires.

7. The method of claim 4 in which at least two of the said wires are of dissimilar material and in which the said disk includes both a solder which wets one of the said wires and a composition which alloys with the other of the said wires.

References Cited in the file of this patent

UNITED STATES PATENTS

| | | |
|---|---|---|
| 1,188,055 | Faile | June 20, 1916 |
| 2,397,052 | Schietinger | Mar. 19, 1946 |
| 2,757,324 | Pearson | July 31, 1956 |